United States Patent
Hung et al.

(10) Patent No.: US 11,757,789 B2
(45) Date of Patent: Sep. 12, 2023

(54) ELECTRONIC DEVICE AND FRAME TRANSMISSION METHOD OF ELECTRONIC DEVICE

(71) Applicant: Realtek Semiconductor Corp., HsinChu (TW)

(72) Inventors: Han-Yi Hung, HsinChu (TW); Cheng-Yan Wu, HsinChu (TW); Sheng-Pin Lin, HsinChu (TW); Yi-Kuang Ko, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/950,126

(22) Filed: Sep. 22, 2022

(65) Prior Publication Data
US 2023/0122404 A1     Apr. 20, 2023

(30) Foreign Application Priority Data
Oct. 20, 2021   (TW) ................................ 110138858

(51) Int. Cl.
*H04L 47/6275*   (2022.01)
*H04L 47/2441*   (2022.01)
(Continued)

(52) U.S. Cl.
CPC .......... *H04L 47/6275* (2013.01); *H04L 47/16* (2013.01); *H04L 47/245* (2013.01); *H04L 47/2441* (2013.01)

(58) Field of Classification Search
CPC . H04L 47/6275; H04L 47/16; H04L 47/2441; H04L 47/245
See application file for complete search history.

(56) References Cited

U.S. PATENT DOCUMENTS 7,826,360 B1 * 11/2010 Hutchison ........... H04L 63/0428
                                                          370/254
9,929,928 B1 *  3/2018 Dekoos ................. H04L 41/147
(Continued)

FOREIGN PATENT DOCUMENTS

TW        200507559 A    2/2005
TW        201338469 A    9/2013
TW          I722947 B    3/2021

OTHER PUBLICATIONS

Matheus Guedes De Andrade, Priority-based Flow Control, retrieved from https://www.gta.ufrj.br/ensino/eel879/trabalhos_vf_2014_2/matheus/flowcontrol.html, Feb. 2014.

*Primary Examiner* — Redentor Pasia
(74) *Attorney, Agent, or Firm* — Winston Hsu (57) ABSTRACT

The present invention provides a frame transmission method of an electronic device, wherein the frame transmission method includes the steps of: receiving a pause frame from another electronic device, wherein the pause frame includes a plurality of inter frame gap control indicator, and each of the inter frame gap control indicator includes a plurality of packet size ranges and corresponding pause times; selecting one of the inter frame gap control indicator according to a priority of a first packet to be sent to the other electronic device, and determining a first inter frame gap according to which packet size range the first packet belongs to; and after a first frame including the first packet is sent to the other electronic device, at least waiting for the first inter frame gap before starting to send a second frame to the other electronic device.

13 Claims, 5 Drawing Sheets

(51) Int. Cl.
*H04L 47/10* (2022.01)
*H04L 47/24* (2022.01)

(56) References Cited

U.S. PATENT DOCUMENTS

| | | | |
|---|---|---|---|
| 2005/0182848 A1* | 8/2005 | McNeil, Jr. | H04L 47/17 709/236 |
| 2008/0192631 A1* | 8/2008 | Ardhanari | H04L 47/10 370/230.1 |
| 2010/0177637 A1 | 7/2010 | Kadambi | |
| 2012/0287829 A1* | 11/2012 | Chang | H04L 12/12 370/296 |
| 2014/0192724 A1* | 7/2014 | Turunen | H04W 74/0808 370/329 |
| 2016/0337971 A1* | 11/2016 | Bhargava | H04W 52/0216 |
| 2017/0279741 A1* | 9/2017 | Elias | H04L 43/16 |
| 2017/0280460 A1* | 9/2017 | Emmanuel | H04L 5/0055 |
| 2022/0255872 A1* | 8/2022 | Srinivasan | H04L 47/266 |

\* cited by examiner

ELECTRONIC DEVICE AND FRAME TRANSMISSION METHOD OF ELECTRONIC DEVICE

BACKGROUND OF THE INVENTION

1. Field of the Invention

The present invention relates to frame transmission, and more particularly, to a frame transmission method of an electronic device.

2. Description of the Prior Art

In the IEEE 802.3x specification, a pause frame is mentioned for the receiving end to transmit the pause frame to the transmitting end when the network is congested, so as to notify the transmitting end to suspend sending out packets to alleviate the congestion. In addition, before the transmitting end can start over to send the packet to the receiving end, the transmitting end needs to wait until a pause time indicated by the pause frame expires or the receiving end sends another packet to notify that it can resume receiving the packet. However, in the above operation, when network congestion occurs, the transmitting end will always switch between a full-speed transmission mode and a suspended transmission mode when transmitting packets, such that the packet flow is extremely uneven. In addition, the receiving end needs to continuously detect a current state of the packet buffer to transmit the pause frame in time, which also causes processing burdens on circuits of the receiving end.

SUMMARY OF THE INVENTION

One of the objectives of the present invention is to provide a packet transmission method for a network device, which can adjust a pause time after subsequent packet transmission according to the size and the priority of the packet, such that the overall packet flow can be more even, in order to prevent the transmitting end from sending too many packets instantly and causing network congestion or accumulation of packets in the receiving end.

At least one embodiment of the present invention provides a frame transmission method of an electronic device. The frame transmission method comprises: establishing a link with another electronic device to establish a plurality of virtual lanes, wherein each of the plurality of virtual lane has a corresponding priority; receiving a pause frame from the another electronic device, wherein the pause frame comprises a plurality of inter frame gap control indicators, and each of the plurality of inter frame gap control indicators indicates a plurality of packet size ranges and corresponding pause times; referring to the pause frame to select one of the plurality of inter frame gap control indicators according to a priority of a first packet to be sent to the another electronic device, and determining a first inter frame gap according to which packet size range a packet size of the first packet belongs to; sending a first frame comprising the first packet to the another electronic device through one of the plurality of virtual lanes that corresponds to a same priority as the first packet; and after the first frame is sent to the another electronic device, at least waiting for the first inter frame gap before starting to send a second frame to the another electronic device.

At least one embodiment of the present invention provides an electronic device configured to establish a link with another electronic device to establish a plurality of virtual lanes. Each of the plurality of virtual lane has a corresponding priority. The electronic device comprises a receiving circuit, a inter frame gap controller and a transmitting circuit. The receiving circuit is configured to receive a pause frame from the another electronic device. The pause frame comprises a plurality of inter frame gap control indicators, and each of the plurality of inter frame gap control indicators indicates a plurality of packet size ranges and corresponding pause times. The inter frame gap controller is configured to refer to the pause frame to select one of the plurality of inter frame gap control indicators according to a priority of a first packet to be sent to the another electronic device, and to determine a first inter frame gap according to which packet size range a packet size of the first packet belongs to. The transmitting circuit is configured to send a first frame comprising the first packet to the another electronic device through one of the plurality of virtual lanes that has a same priority as the first packet. After the first frame is sent to the another electronic device, at least wait for the first inter frame gap before starting to send a second frame to the another electronic device.

At least one embodiment of the present invention provides a frame transmission method of an electronic device. The frame transmission method comprises: establishing a link with another electronic device to establish a plurality of virtual lanes, wherein each of the plurality of virtual lane has a corresponding priority; sending a pause frame to the another electronic device, wherein the pause frame indicates a plurality of inter frame gap control indicators, and each of the plurality of inter frame gap control indicators comprises a plurality of packet size ranges and corresponding pause times for being used by the another electronic device; and receiving a plurality of frames from the another electronic device, wherein each frame is received through a virtual lane that has a same priority as a packet in the frame, and a gap between the plurality of frames is determined by the another electronic device according the plurality of packet size ranges and corresponding pause times indicated by at least one of the plurality of inter frame gap control indicators.

At least one embodiment of the present invention provides an electronic device configured to establish a link with another electronic device to establish a plurality of virtual lanes. Each of the plurality of virtual lane has a corresponding priority. The electronic device comprises a transmitting circuit and a receiving circuit. The transmitting circuit is configured to send a pause frame to the another electronic device. The pause frame comprises a plurality of inter frame gap control indicators, and each of the plurality of inter frame gap control indicators indicates a plurality of packet size ranges and corresponding pause times for being used by the another electronic device. The receiving circuit is configured to receive a plurality of frames from the another electronic device. Each frame is received through a virtual lane that has a same priority as a packet in the frame. A gap between the plurality of frames is determined by the another electronic device according the plurality of packet size ranges and corresponding pause times indicated by at least one of the plurality of inter frame gap control indicators.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
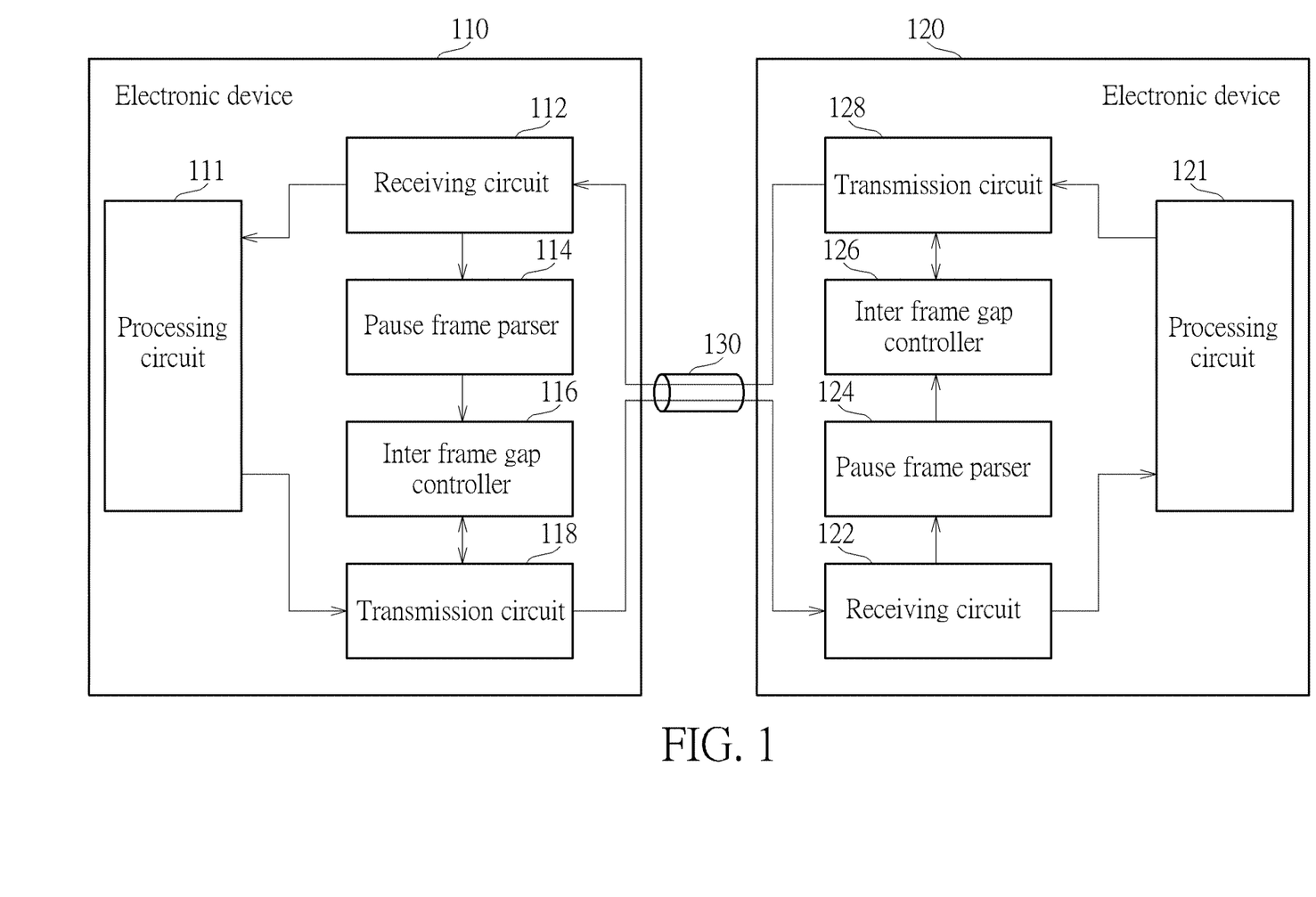
FIG. 1 is a diagram illustrating a network system according to an embodiment of the present invention.

FIG. 1 is a diagram illustrating a network system according to an embodiment of the present invention. As shown in FIG. 1, the network system includes two electronic devices 110 and 120, where the electronic devices 110 and 120 are connected by a network cable 130 for data transmission and reception. In the present embodiment, the electronic devices 110 and 120 both support Full-Duplex Ethernet and IEEE 802.3x specification. The electronic device 110 includes a processing circuit 111, a receiving circuit 112, a pause frame parser 114, an inter frame gap controller 116 and a transmitting circuit 118; and the electronic device 120 includes a processing circuit 121, a receiving circuit 122, a pause frame parser 124, an inter frame gap controller 126 and a transmitting circuit 128. The electronic devices 110 and 120 in the present embodiment can be any electronic devices that can use a network cable for data transmission and reception, such as switches, routers or any electronic devices that can be connected to a network cable. It is noticed that in another embodiment, the pause frame parser 114, the inter frame gap controller 116 and the processing circuit 111 can be integrated in a single circuit according to design requirements, but the present invention is not limited thereto.

Figure 2:
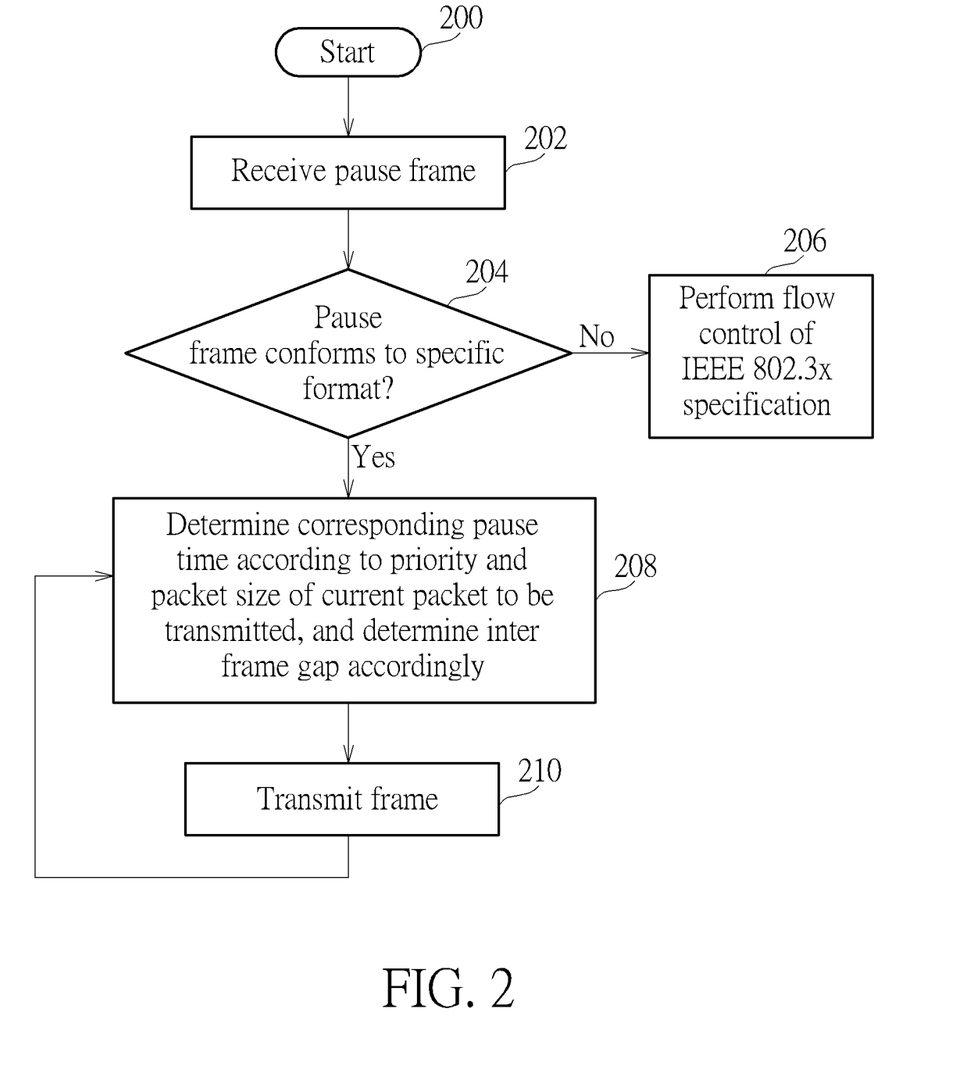
FIG. 2 is a flowchart illustrating a frame transmission method of an electronic device.
Figure 3:
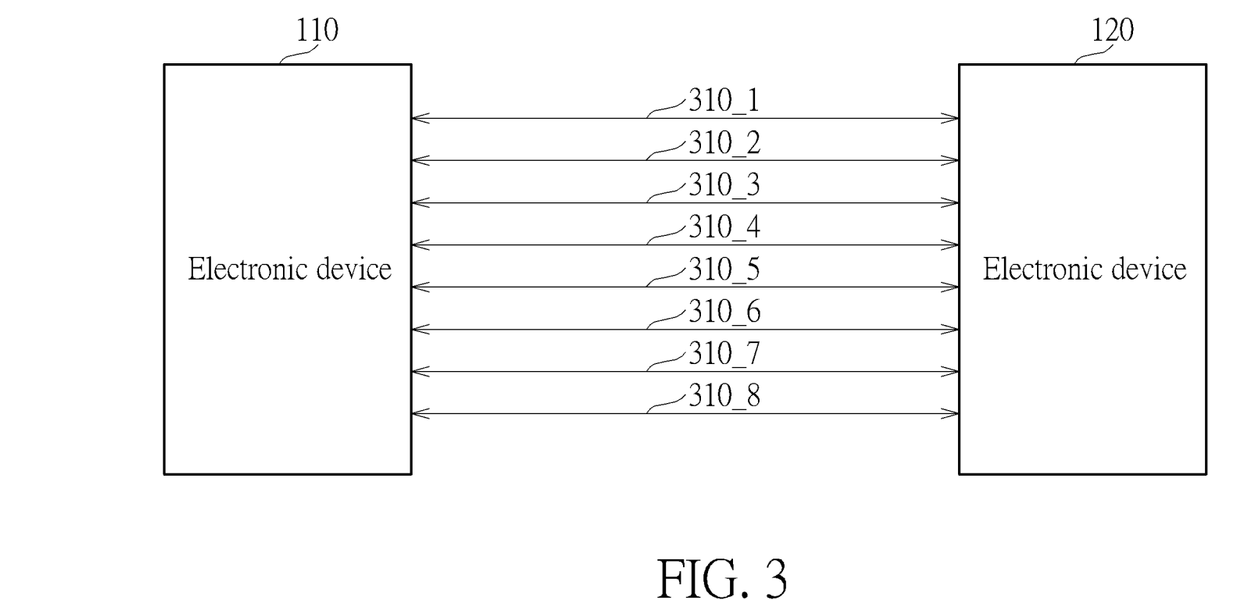
FIG. 3 is a diagram illustrating multiple virtual lanes established between electronic devices.

In the following description of the operation of the electronic device 110, the flowchart shown in FIG. 2 can be referred to in conjunction with FIG. 1. In step 200, the flow starts, and the electronic device 110 establishes a link with the electronic device 120 and starts signal transmission and reception. In the present embodiment, the electronic device 110 and the electronic device 120 can establish multiple virtual lanes on a single Ethernet link, e.g., eight virtual lanes 310_1-310_8 shown in FIG. 3, where the virtual lanes 310_1-310_8 can be individually paused or restarted, that is, when the packet transmission of one of the virtual lanes is paused, the packet transmission of other virtual lanes may not need to be interrupted. Since the content of the virtual lane can refer to the standard of IEEE 802.1 Qbb, and is known to those skilled in the art, further description is omitted here for simplicity. In addition, each virtual lane is assigned a priority conforming with IEEE 802.1P (in one embodiment, the priority may be a class of service (CoS)), where a quantity of priorities may be eight, that is, each virtual lane has one of eight priorities, but the present invention is not limited thereto.

Figure 4:
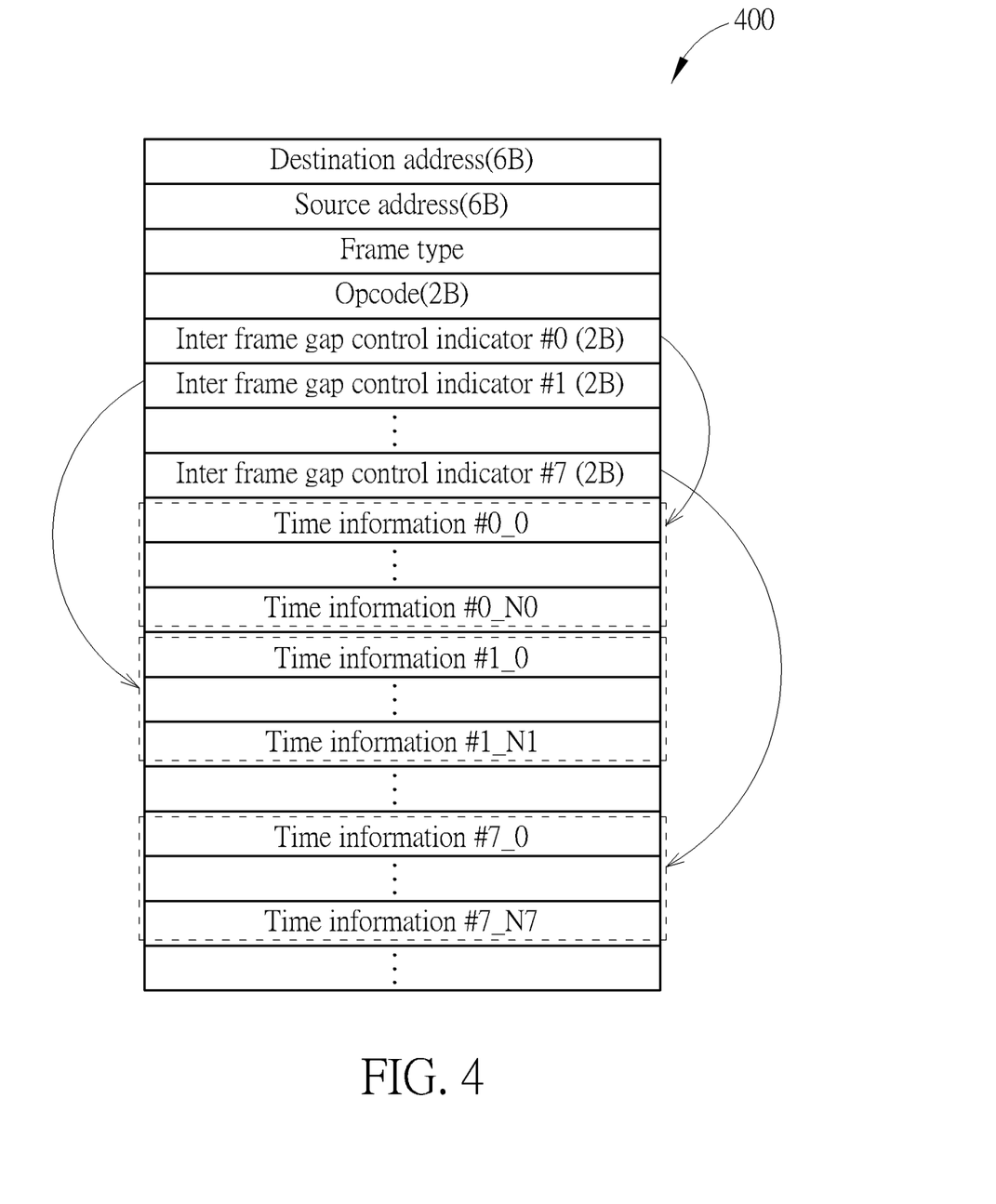
FIG. 4 is a diagram illustrating a pause frame according to an embodiment of the present invention.

In step 202, the receiving circuit 112 receives the frame/packet from the electronic device 120 through the network cable 130, parses the received frame/packet, and then sends the frame/packet to the processing circuit 111 for subsequent processing. In the present embodiment, the receiving circuit 112 receives a pause frame from the electronic device 120, and transmits the pause frame to the pause frame parser 114 for analysis. In step 204, the pause frame parser 114 analyzes the received pause frame and determines whether the pause frame conforms to a specific format. If No, the flow proceeds with step 206; if Yes, the flow proceeds with step 208. Specifically, referring to the diagram of a pause frame 400 conforming to a specific format according to an embodiment of the present invention as shown in FIG. 4, the pause frame 400 includes multiple fields, and the multiple fields may include a 6-byte destination address, a 6-byte source address, a 2-byte frame type, a 2-byte operation code (opcode), multiple 2-byte inter frame gap control indicators (in the present embodiment, eight inter frame gap control indicators #0-#7 are provided) and eight sets of time information, where one inter frame gap indicator corresponds to a set of time information. For example, the inter frame gap control indicator #0 points to the time information #0_0-#0_N0, the inter frame gap control indicator #1 points to the time information #1_0-#1_N1, . . . , and the inter frame gap control indicator #7 points to the time information #7_0-#7_N7. It should be noted that the destination address, the source address, the type and the opcode in the pause frame 400 shown in FIG. 4 are fields defined by the IEEE 802.3x specification, and their contents and functions may be referred to the IEEE 802.3x specification. In the present embodiment, since only a part of the code words of the 2-byte opcode in the IEEE 802.3x specification have definitions, the pause frame 400 can be configured to set the opcode to a code word that has not yet been defined in the current IEEE 802.3x specification, such as 0xfd, to indicate that the pause frame 400 has a specific format. In the present embodiment, if the content of the opcode is defined in the current IEEE 802.3x specification, e.g., the opcode 0x0001, the pause frame parser 114 determines that the received pause frame does not conform to a specific format; and if the content of the opcode conforms the code words corresponding to the specific format, such as 0xfd, the pause frame parser 114 determines that the received pause frame conforms to the specific format.

In step 204, the main content used for checking if the pause frame 400 conforms to the specific format relies on the opcode, the inter frame gap control indicator and the time information, and the operations and definitions of the remaining fields can refer to the IEEE 802.3x specification. Therefore, the following description mainly focuses on the opcode, the inter frame gap control indicator and the time information.

In step 206, since the pause frame received by the receiving circuit 112 does not conform to the specific format, the flow control of the IEEE 802.3x specification is performed. The operation of the electronic device 110 can skip the inter frame gap controller 116, and the transmission circuit 118 suspends the transmission of subsequent frames until the pause time indicated in the pause frame expires, or until the receiving circuit 112 receives a message indicating that packet transmission can be resumed.

In step 208, the inter frame gap controller 116 temporarily stores the inter frame gap control indicators #0-#7 and the corresponding time information shown in FIG. 4 in the internal register or memory for determining the inter frame gap for subsequent frame transmission. Specifically, the inter frame gap control indicators #0-#7 can respectively correspond to different priorities (e.g., different classes of service (CoS)), and each inter frame gap control indicator and corresponding time information can be regarded as including multiple packet size ranges and corresponding pause times. When the processing circuit 111 needs to transmit data to the electronic device 120, the transmitting circuit 118 transmits the information related to the packet size of the current packet to be transmitted to the inter frame gap controller 116, and the inter frame gap controller 116 determines the corresponding pause time according to the priority and the packet size of the current packet to be transmitted to the electronic device 120, and determines the inter frame gap accordingly, such that the transmitting circuit 118 pauses packet transmission for a period of time (that is, the inter frame gap) after transmitting the current packet to the electronic device 120, and then starts over to send the next frame. In the present embodiment, the inter frame gap controller 116 can determine the priority of the packet by checking the priority field in the header of the virtual local area network of the packet. For example, the inter frame gap controller 116 determines which of the eight priorities the priority of the packet belongs to. The packet size can be the size of the packet that is actually sent by the network layer, the data link layer or the physical layer in the frame.

The operation of the inter frame gap controller 116 is described in detail. In the following embodiments, it is assumed that the inter frame gap controller 116 has selected the inter frame gap control indicator #0 according to the priority of the current packet to be transmitted to the electronic device 120, and the inter frame gap control indicator #0 can be used to indicate multiple packet size ranges. For example, the inter frame gap control indicator #0 includes 2 bytes (16 bits), among which the 0th to 3rd bits can be used to represent 16 or fewer effective index values, and the 4th to 15th bits can be used to represent a parameter INC, where the packet size range represented by the inter frame gap control indicator #0 may be shown in the following Table 1:

TABLE 1

| Index value | Packet size range |
|---|---|
| 0 | PKT_S < 64 B |
| 1 | 64 B ≤ PKT_S < 64 B + INC |
| 2 | 64 B + INC ≤ PKT_S < 64 B + 2*INC |
| 3 | 64 B + 2*INC ≤ PKT_S < 64 B + 3*INC |
| ... | ... |
| 15 | 64 B + 14*INC ≤ PKT_S |

In the content of Table 1, "PKT_S" is used to indicate the size of the packet, "B" is used to indicate a byte, and the parameter INC can be any suitable value, such as 64 bytes.

In one embodiment, each of the time information #0_0-#0_N0 corresponding to the inter frame gap control indicator #0 includes 2 bytes (16 bits), where the 0th to 3rd bits can be used to indicate the pause time calculated by using the packet size, and the 4th to 15th bits can be used to indicate a fixed pause time, where the time information #0_0-#0_N0 may be shown in the following Table 2:

TABLE 2

| Index value | Pause time calculated by using packet size | fixed pause time |
|---|---|---|
| Time information #0_0 | 0 | 0 |
| Time information #0_1 | PKT_S*T | T |
| Time information #0_2 | (PKT_S/2)*T | 2*T |
| Time information #0_3 | (PKT_S/4)*T | 3*T |
| ... | ... | ... |
| Time information #0_7 | (PKT_S/2^(7 − 1))*T | 7*T |
| ... | ... | ... |

In the content of Table 2, time information #0_0 corresponds to the index value "0" of Table 1, time information #0_1 corresponds to the index value "1" of Table 1, time information #0_2 corresponds to the index value "2" of Table 1, and so on. "T" is used to indicate the length of the pause time, where "T" can be 8 bit time, and one bit time is the time required for the electronic device 110 to transmit 1-bit data. For example, for a 100 Mbps (Million bits per second) Ethernet, 1 bit time is 10 nanoseconds; and for a 1000 Mbps Ethernet, 1 bit time is 1 nanosecond. In addition, the pause time calculated by using the packet size can directly use the integer part of the calculation result, and the pause time of each of the time information #0_0-#0_N0 is the sum of the pause time calculated using the packet size and the fixed pause time in Table 2.

In one example, it is assumed that the transmission circuit 118 is currently preparing to transmit a 130-byte packet to the electronic device 120. When the parameter INC is set to 64 bytes, since the packet size corresponds to the index value "2" in Table 1, the calculation result of the pause time corresponds to the time information #0_2 in Table 2, where the pause time calculated by using the packet size is 65*T, and the fixed pause time is 2*T. Therefore, the pause time calculated from Table 2 is 67*T.

After the pause time of the frame to be transmitted by the transmission circuit 118 is determined, the inter frame gap controller 116 can determine the inter frame gap according to the pause time. Specifically, since IEEE 802.3x defines that a minimum preset gap between two consecutive frames is not shorter than 96 bit time, the inter frame gap controller 116 can add 96 bit time to the pause time calculated according to Table 2, to obtain the final inter frame gap. For example, assuming that the transmitting circuit 118 is currently preparing to transmit a 130-byte packet to the electronic device 120, the pause time calculated according to Table 2 is 67*8 bit time, and the inter frame gap finally determined by the inter frame gap controller 116 is (96+ 67*8) bit time.

It should be noted that the above calculation of the pause time and inter frame gap is only an example and not a limitation of the present invention. As long as the inter frame gap controller 116 can determine different inter frame gaps according to the priority of the packet to be transmitted and the packet size, the contents of Table 1 and Table 2 above can be changed accordingly, or can be integrated into a single look-up table that can be used to directly determine the corresponding inter frame gap based on the packet size. These related implementation changes should all belong to the scope of the present invention.

In addition, the above embodiment uses the inter frame gap control indicator #0 and the corresponding time information #0_0-#0_N0 for illustration. In other embodiments, if the packets that need to be transmitted to the electronic device 120 have different priorities (for example, the packets need to be transmitted through different virtual lanes later), the inter frame gap controller 116 may select other inter frame gap control indicators and corresponding time information, and these other inter frame gap control indicators and corresponding time information have parameters which are not all the same. That is, the packet size range and parameter INC in Table 1 and the pause time and fixed pause time calculated by using the packet size in Table 2 may vary according to different priorities.

In step 210, the transmission circuit 118 selects a virtual lane that has the same priority as the packet, and transmits the frame to the electronic device 120 through the virtual lane corresponding to the same priority, and the flow proceeds to step 208. For example, if the priority field of the header of the virtual local area network of the packet indicates that the priority of the packet is "0", the packet is transmitted through the virtual lane 310_1; if the priority field of the header of the virtual local area network of the packet indicates that the priority of the packet is "1", the packet is transmitted through the virtual lane 310_2; and so on. In addition, after transmission of the current frame is completed, the transmitting circuit 118 pauses frame transmission for a period of time before transmitting the next frame, such that the next frame and the currently transmitted frame have the above-determined inter frame gap. In detail, assuming that the transmitting circuit 118 needs to transmit a first frame, a second frame and a third frame in sequence, the inter frame gap controller 116 can determine a first inter frame gap corresponding to the first frame and a second inter frame gap corresponding to the second frame according to the above-mentioned mechanism, such that the transmitting circuit 118 starts to transmit the second frame after pausing frame transmission for the time period of the first inter frame gap since an end of the transmission of the first frame, and starts to transmit the third frame after pausing frame transmission for the time period of the second inter frame gap since an end of the transmission of the second frame.

It should be noted that if the pause frame transmitted from the electronic device 120 in the beginning has the pause frame 400 shown in FIG. 4, the inter frame gap controller 116 temporarily buffers each of the inter frame gap control indicators #0~#7 recorded in the pause frame 400, the packet size range recorded in the corresponding time information, and information about the corresponding pause time or inter frame gap. Then, when the transmission circuit 118 needs to transmit packets, the inter frame gap controller 116 may sequentially determine an inter frame gap between an end of transmission of each packet and a next frame according to the priority and packet size of each packet, in order to accurately control the network flow between the electronic device 110 and the electronic device 120. In this way, the problem of serious uneven transmission speed of the electronic device 110 described in the prior art can be prevented. In addition, since the packet size range and the corresponding pause time recorded in the pause frame 400 or information of inter frame gap are temporarily stored in the memory or the register in the inter frame gap controller 116 for subsequent long-term use. Therefore, the electronic device 120 does not need to send a pause frame to the electronic device 110 frequently, and only needs to send a new pause frame 400 to update the packet size range and the corresponding pause time or inter frame gap when necessary (e.g., when a network congestion occurs suddenly), such that each packet may have a larger inter frame gap for subsequent transmission.

In addition, since the network interface speed of the electronic devices 110 and 120 must not be higher than the committed information rate (CIR) of the network service provider, if the electronic devices 110 and 120 use the highest rate for transmission, the electronic devices 110 and 120 continuously switch between the full-speed transmission state and the suspended transmission state. Therefore, the electronic device 120 can determine the packet size range and the corresponding pause time or the information of inter frame gap according to the above-mentioned committed information rate, and transmit the information carried in the pause frame 400 to the electronic device 110, such that the flow between the electronic devices 110 and 120 may be relatively even.

In the description of the above embodiment, the electronic device 110 receives the pause frame from the electronic device 120, determines the inter frame gap according to the priority of the packet and the packet size, and then transmits the frame to the electronic device 120. However, the electronic devices 110 and 120 support full-duplex Ethernet. Similarly, the electronic device 120 can also receive the pause frame from the electronic device 110, and transmit the frame to the electronic devices 110 after determining the inter frame gap according to the priority of the packet and the packet size. Since they have the same or similar operations, that is, the operations of the processing circuit 121, the receiving circuit 122, the pause frame parser 124, the inter frame gap controller 126 and the transmission circuit 128 of the electronic device 120 are similar to the processing circuit 111, the receiving circuit 112, the pause frame parser 114, the inter frame gap controller 116 and the transmitting circuit 118 of the above-mentioned electronic device 110, so the relevant details are not repeated in detail here.

Figure 5:
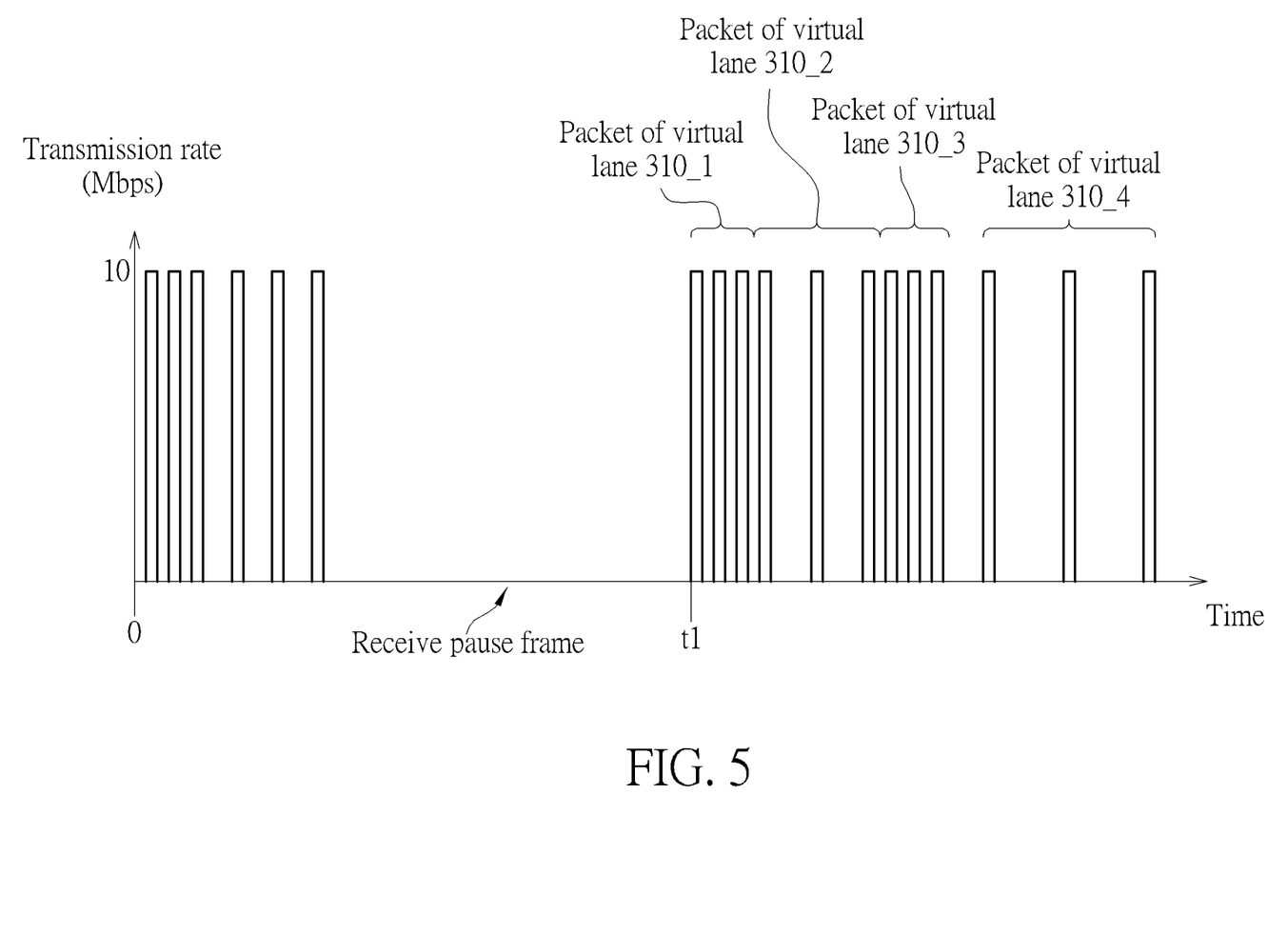
FIG. 5 is a diagram illustrating the frame transmission method according to an embodiment of the present invention.

FIG. 5 is a diagram illustrating the frame transmission method according to an embodiment of the present invention. In FIG. 5, it is assumed that the electronic device 110 sequentially transmits packets of virtual lanes 310_1, 310_2, 310_1 and 310_4 to the electronic device 120, and the virtual lanes 310_1, 310_2 and 310_4 have different priorities. After the electronic device 110 receives the pause frame from the electronic device 120, at time t1, the electronic device 110 can start to determine the inter frame gap according to the priority level and the packet size of the current packet to be transmitted to the electronic device 120 as described in the above embodiments. As shown in FIG. 5, the electronic device 110 uses the first inter frame gap to transmit the packet of the virtual lane 310_1, and then uses the second inter frame gap to transmit the packet of the virtual lane 310_2, and then uses the first inter frame gap to transmit the packet of the virtual lane 310_1 (assuming that the packet size of the packet of the virtual lane 310_1 and the packet size of the previous packet are similar or the same), and finally the third inter frame gap is used to transmit the packet of the virtual lane 310_4. According to the above arrangement, the electronic device 110 needs to receive a pause packet only once, and can calculate the inter frame gap suitable for each packet according to the information in the pause packet, such as inter frame gap control indicators #0-#7 and the corresponding time information. In this way, the electronic device 110 can transmit the packets with a stable transmission rate.

Briefly summarizing the present invention, in the electronic device and the related frame transmission method of the present invention, after receiving a pause frame from another electronic device, the inter frame gap controller in the electronic device can determine the inter frame gap required for subsequent frame transmission according to the information recorded in the pause frame. Through the present invention, the flow between electronic devices can be appropriately controlled to prevent the problem that the frame transmission switches between the full-speed transmission state and the suspended transmission state when the network is congested in the prior art. In addition, since another electronic device does not need to send the pause frame all the time, the processing burden on another electronic device can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame transmission method of an electronic device, comprising:
    establishing a link with another electronic device to establish a plurality of virtual lanes, wherein each of the plurality of virtual lane has a corresponding priority;
    receiving a pause frame from the another electronic device, wherein the pause frame comprises a plurality of inter frame gap control indicators, and each of the plurality of inter frame gap control indicators indicates a plurality of packet size ranges and corresponding pause times;
    referring to the pause frame to select one of the plurality of inter frame gap control indicators according to a priority of a first packet to be sent to the another electronic device, and determining a first inter frame gap according to which packet size range a packet size of the first packet belongs to;
    sending a first frame comprising the first packet to the another electronic device through one of the plurality of virtual lanes that corresponds to a same priority as the first packet; and
    after the first frame is sent to the another electronic device, at least waiting for the first inter frame gap before starting to send a second frame to the another electronic device.

2. The frame transmission method of claim 1, wherein the priority of the first packet is a class of service (CoS).

3. The frame transmission method of claim 1, wherein the plurality of inter frame gap control indicators correspond to different priorities, respectively, and the plurality of packet size ranges and corresponding pause times in each of the plurality of inter frame gap control indicators are not all the same.

4. The frame transmission method of claim 1, further comprising:
    referring to the pause frame to determine a second inter frame gap according to which packet size range a packet size of a second packet to be sent to the another electronic device belongs to;
    sending the second frame comprising the second packet to the another electronic device through a virtual lane that has a same priority as the second packet; and
    after the second frame is sent to the another electronic device, at least waiting for the second inter frame gap before starting to send a third frame to the another electronic device.

5. The frame transmission method of claim 1, wherein the plurality of pause times are not all the same.

6. The frame transmission method of claim 5, wherein determining the first inter frame gap according to which packet size range the packet size of the first packet belongs to comprises:
    determining a first pause time according to which packet size range the packet size of the first packet to be sent to the another electronic device belongs to; and
    calculating the first inter frame gap according to the first pause time and a minimum predetermined gap.

7. The frame transmission method of claim 6, wherein determining the first pause time according to which packet size range the packet size of the first packet to be sent to the another electronic device belongs to comprises:
    determining a pause time calculated by using the packet size and a fixed pause time according to which packet size range the packet size of the first packet to be sent to the another electronic device belongs to; and
    calculating the first pause time according to the pause time calculated by using the packet size and the fixed pause time.

8. The frame transmission method of claim 1, further comprising:
    temporarily storing the plurality of inter frame gap control indicators in the pause frame and the plurality of packet size ranges and corresponding pause times indicated by each inter frame gap control indicator into the electronic device, for determining inter frame gaps corresponding to multiple frames subsequently transmitted to the another electronic device.

9. An electronic device, configured to establish a link with another electronic device to establish a plurality of virtual lanes, wherein each of the plurality of virtual lane has a corresponding priority, the electronic device comprising:
    a receiving circuit, configured to receive a pause frame from the another electronic device, wherein the pause frame comprises a plurality of inter frame gap control indicators, and each of the plurality of inter frame gap control indicators indicates a plurality of packet size ranges and corresponding pause times;
    an inter frame gap controller, configured to refer to the pause frame to select one of the plurality of inter frame gap control indicators according to a priority of a first packet to be sent to the another electronic device, and to determine a first inter frame gap according to which packet size range a packet size of the first packet belongs to; and
    a transmitting circuit, configured to send a first frame comprising the first packet to the another electronic device through one of the plurality of virtual lanes that has a same priority as the first packet, and after the first frame is sent to the another electronic device, at least wait for the first inter frame gap before starting to send a second frame to the another electronic device.

10. The electronic device of claim 9, wherein the priority of the first packet is a class of service (CoS).

11. The electronic device of claim 9, wherein the plurality of inter frame gap control indicators correspond to different priorities, respectively, and the plurality of packet size ranges and corresponding pause times in each of the plurality of inter frame gap control indicators are not all the same.

12. The electronic device of claim 9, wherein the inter frame gap controller is further arranged to refer to the pause frame to determine a second inter frame gap according to which packet size range a packet size of a second packet to be sent to the another electronic device belongs to; and the transmitting circuit is further arranged to send the second frame comprising the second packet to the another electronic device through a virtual lane that has a same priority as the second packet; and after the second frame is sent to the other electronic device, the transmitting circuit is further arranged to at least wait for the second inter frame gap before starting to send a third frame to the another electronic device.

13. An electronic device, configured to establish a link with another electronic device to establish a plurality of virtual lanes, wherein each of the plurality of virtual lane has a corresponding priority, the electronic device comprising:
    a transmitting circuit, configured to send a pause frame to the another electronic device, wherein the pause frame comprises a plurality of inter frame gap control indicators, and each of the plurality of inter frame gap control indicators indicates a plurality of packet size ranges and corresponding pause times for being used by the another electronic device; and a receiving circuit, configured to receive a plurality of frames from the another electronic device, wherein each frame is received through a virtual lane that has a same priority as a packet in the frame, and a gap between the plurality of frames is determined by the another electronic device according the plurality of packet size ranges and corresponding pause times indicated by at least one of the plurality of inter frame gap control indicators.

* * * * *